Aug. 27, 1968 — D. L. THOMPSON — 3,398,513
SCRUBBER APPARATUS
Filed Jan. 9, 1967
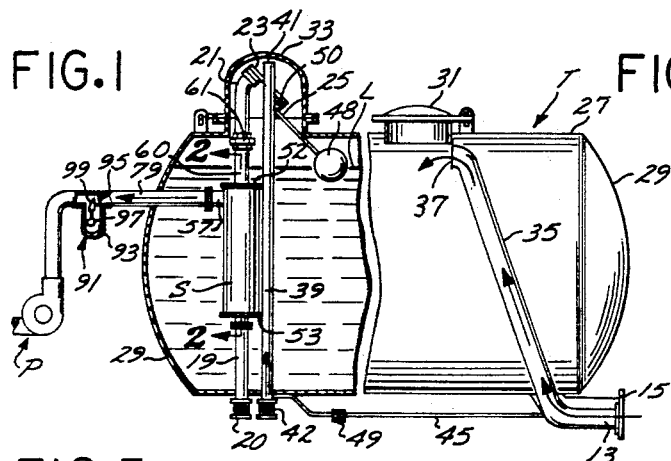
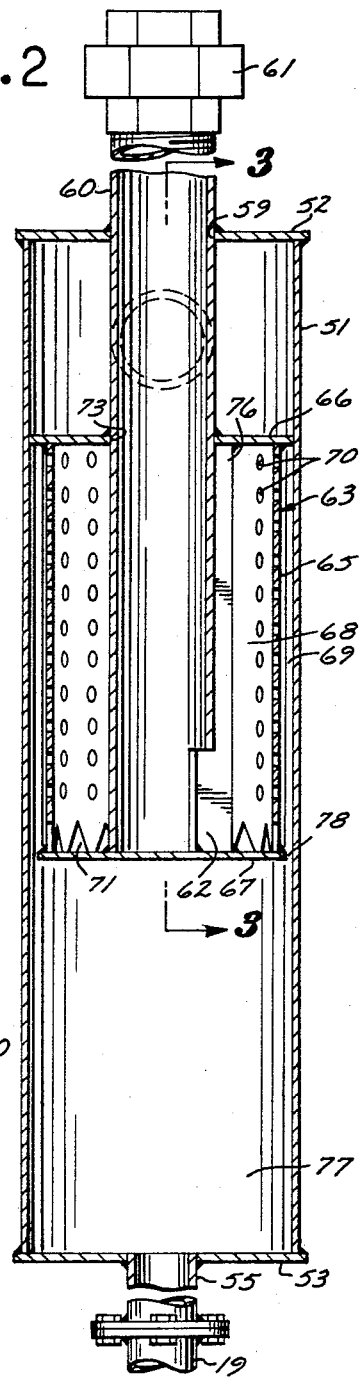
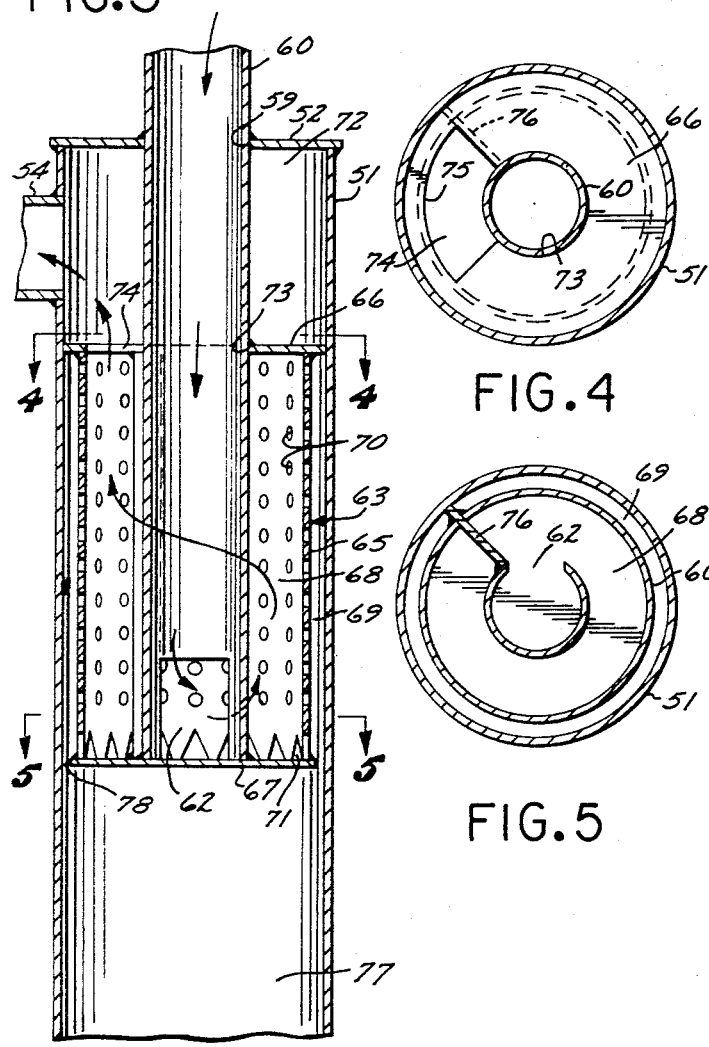
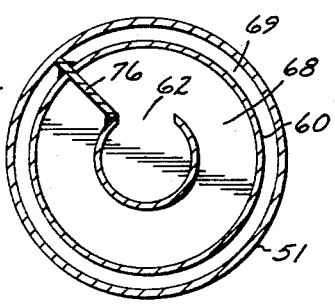
INVENTOR.
DAVID L. THOMPSON
BY Fulwider, Patton, Rieber, Lee and Utecht
ATTORNEYS

United States Patent Office 3,398,513
Patented Aug. 27, 1968

3,398,513
SCRUBBER APPARATUS
David L. Thompson, 2019 E. Wardlow,
Long Beach, Calif. 90807
Filed Jan. 9, 1967, Ser. No. 608,217
2 Claims. (Cl. 55—449)

ABSTRACT OF THE DISCLOSURE

A scrubber including a vertically elongated outer container and a separator disposed within the container and having perforated vertical walls telescopically arranged relative to the vertical walls of the container and cooperating therewith to form an isolation chamber. A vertically extending flow directing web projects inwardly from a vertical wall of the separator. The separator inlet is in the lower portion of the separator and on one side of the web while the separator outlet is in the upper portion of the separator and on the side of the web opposite the inlet whereby, when a vacuum is applied to the outlet and fluid is introduced through the inlet, such fluid will be pulled spirally upwardly around the web and in an arcuate path tangential to the inner surface of the perforated wall to cause relatively dense foreign material suspended in the fluid to pass through the perforations and into the isolation chamber while the remaining fluid will flow upwardly through the outlet.

---

The present invention relates generally to scrubbers and is particularly directed to a scrubber to be used in separating relatively dense foreign material from a less dense fluid.

Frequently tank trucks are provided for transporting fluids, such as oil, and these trucks are loaded by means of a vacuum pump that applies a vacuum to the interior of the tank whereby atmospheric pressure forces the fluid to be loaded through an inlet line into the tank. A tank of this type is shown in United States Letters Patent No. 2,664,911, issued Jan. 5, 1954. It is desirable to protect the vacuum pump in a truck of this type from contaminants by separating such contaminants from the air being pumped out of the tank. Conventional scrubbers have proven ineffective to handle the desired air flow rate and effect the desired purity in the air being pumped through the vacuum pump of a tank of this type.

It is a major object of this invention to provide a new and novel scrubber that will function effectively in a vacuum system.

It is another object to provide a scrubber that will function effectively at high rates of flow.

It is a further object to provide a scrubber that is effective in separating large slugs of foreign material from the gas or fluid being pumped as well as comparatively small particles of foreign material.

Other objects and features of the invention will become apparent from consideration of the following description, when taken in connection with the accompanying drawings, in which:

FIGURE 1 is a fragmentary partially cut-away side view of a vacuum tank utilizing a preferred form of scrubber embodying the present invention;

FIGURE 2 is a vertical sectional view of said scrubber taken in enlarged scale along the lines 2—2 of FIGURE 1;

FIGURE 3 is a vertical sectional view taken along the lines of 3—3 of FIGURE 2;

FIGURE 4 is a horizontal sectional view taken along lines 4—4 of FIGURE 3; and

FIGURE 5 is a horizontal sectional view taken along the lines 5—5 of FIGURE 3.

Referring to the drawings, a portable vacuum and pressure liquid tank apparatus utilizing a preferred form of scrubber S embodying the present invention is shown in FIGURE 1, such apparatus includes a cylindrical tank T supported upon the chassis of a motor-powered vehicle (not shown) in a conventional manner. A power-driven pump P is provided with suitable conventional valving whereby either superatomspheric air pressure or a vacuum can be imposed upon the interior of the tank T. Upon vacuum being applied to the interior of the tank T, liquid will be drawn thereinto through an inlet fitting 13, as indicated by the directional arrows in FIGURE 1. When the pump P applies superatmospheric air pressure to the interior of the tank T the liquid L contained therewithin will be forced out of the tank through a discharge fitting 15 which is communicative with the bottom of the tank.

Since liquids introduced into most vacuum pumps P reduce their efficiency and since many liquids that are loaded into the tank T have a detrimental effect on the seals and other parts of the pump P it is desirable to separate such liquid from the air being pumped. The scrubber S of this invention is provided to accomplish such separation. The scrubber S is positioned in the intermediate portion of the tank T and is supported on an upstanding scrubber drain pipe 19. The drain pipe 19 extends through the bottom of the tank T and includes an externally accessible valve 20 for controlling drainage therefrom. A scrubber stand pipe 21 extends from the upper side of the scrubber S and terminates at a union the upper end of which is secured to a float valve assembly 22 having a flapper 23. The float valve assembly 22 may be similar to that shown in the aforementioned Patent No. 2,664,911.

More particularly, the tank T is of conventional construction and is preferably formed from welded steel plates in the form of an elongated cylindrical shell 27 having bumped ends 29, with the entire tank assembly being constructed sufficiently heavy so as to withstand the internal and external pressures effected by pressurization and evacuation of the interior of the tank. The upper intermediate portion of the tank T is formed with a washout member 31, while the front portion is formed with a conventional dome 33. The inlet fitting 13 is in the form of an elbow disposed on one side of the longitudinal centerline of the tank T and connects with an upwardly and forwardly extending internal riser pipe 35. The upper end of the riser pipe 35 terminates in an opening 37 disposed within the upper portion of tank T.

The discharge fitting 15 is connected with the bottom of the tank T and is arranged alongside the inlet fitting 13 on the opposite side of the longitudinal center line of the tank T. Suitable conventional valves (not shown) are provided for the inlet and discharge fittings.

A vertical bleeder pipe 39 extends up through the bottom of the tank T and terminates within the dome 33 forming an opening 41. An externally accessible conventional shutoff valve 42 controls the flow through the bottom of the bleeder pipe 39. An aerating conduit 45 connects to the bleeder pipe 39 above the valve 42 and extends rearwardly to connect to the front of the discharge fitting 15. A conventional shutoff valve 49 is provided for the aerating conduit 45. This arrangement is described in detail in my copending application Ser. No. 467,200, filed Jan. 28, 1965, and now Patent No. 3,315,611, issued Apr. 25, 1967.

Referring particularly to FIGURE 1, the float valve assembly includes a lever 25 pivotally supported from the bleeder pipe 39 at 50. A float ball 48 is secured to the end of lever 25 opposite flapper 23, such ball being buoyantly lifted by liquid filling the tank T to move the flapper 23 into position to close the upper end of the stand pipe 21.

The scrubber S includes an upright cylindrical outer container 51 having a top wall 52 and a bottom wall 53. A horizontally extending flange fitting 54 is welded in the upper portion of the container 51 for connection with the pump P. The bottom wall includes a vertical bore and a pipe 55 is welded thereinto. Pipe 55 is bolted to the drain pipe 19.

The top wall 52 includes a vertical bore 59. An inlet pipe 60 is coupled to the stand pipe 21 on its upper end by coupling 61 and extends down through the bore 59 coaxially through the upper portion of the container 51. The bottom portion of the inlet pipe 60 forms a side opening inlet 62 intermediate the top and bottom walls 52 and 53. The inlet 62 is of greater flow area than the flow area of the pipe 60, thus providing for minimum flow resistance to the downwardly moving incoming mixture entering the container 51.

A separator, generally designated 63, is disposed in the upper portion of the container 51 and includes a perforated cylindrical shell 65 and circular top and bottom walls 66 and 67, respectively, the latter being integral with said shell. The shell 65 is arranged coaxially with the bottom portion of the inlet pipe 60 and cooperates therewith to form an annular inner flow chamber 68. The shell 65 also cooperates with the surrounding portion of the container 51 to form an outer isolation chamber 69 and the flow chamber 68 is communicative therewith by perforations 70. The perforations 70 are arranged at the corners of approximately one inch squares and are of sufficient individual size to provide a combined flow area that comprises approximately 20% of the total shell area of the shell 65.

The bottom portion of the shell 65 is formed with inverted V-shaped openings 71 that are of substantially greater individual flow area than the individual perforations 70.

The top wall 66 of the separator 63 overlaps the upper end of the shell 65 and peripherally abuts and is welded to the cylindrical container 51 spaced from the top wall 53 to form an outlet chamber 72. A vertical bore 73 is formed in the center of the top wall 66 for accepting the inlet pipe 60 and an outlet opening 74 is formed in said wall, such opening extending outwardly from bore 73 to terminate in an outer arcuate edge 75 that coincides with the inner surface of the shell 65.

The bottom wall 67 of the separator 63 overlaps the bottom end of the shell 65 and is welded thereto and also to the abutting bottom end of the inlet pipe 60. The bottom wall 67 of the separator 63 is of lesser diameter than container 51 and spaced from the bottom wall 53 of the container to form a receptacle 77 that is in communication with the isolation chamber 69 by means of an annular space 78 between the bottom mall 67 of the separator 63 and the container 51.

As shown in FIGURE 4, a flow-directing vertical web 76 extends radially outwardly from the counterclockwise edge of the inlet 62 and through the shell 65 abutting the outer container 51 on its outer end. The web 76 also extends vertically throughout the inner flow chamber 68 and abuts the top wall 66 adjacent the clockwise edge of the outlet 74. Thus, flow through the flow chamber 68 is directed clockwise from the inlet 62 to the outlet 74.

The outlet fitting 54 is connected with a pump line 79 that includes a float-type check valve, generally designated 91, for collecting any liquid that might pass through the scrubber S and for shutting off the line when a predetermined amount of liquid has been collected. The valve 91 is shown diagrammatically in FIGURE 1 and includes a collecting vessel 93 suspended below the line 79 and opening thereinto. A splash plate 95 confronts the flow passage of the line 79 for intercepting liquid being propelled therethrough and directing it downwardly into the collecting vessel 93. A float ball 97 having a valve gate 99 extending upwardly therefrom for closing the line 79 rests in the vessel 93.

From the above it will be clear that when it is desirable to load the tank T, the pump P is started to apply a vacuum on the interior of the tank. A flexible hose (not shown) is then connected on one end with the inlet fitting 13 and other end of the hose is submerged into the liquid to be loaded. The inlet valve (not shown) is then opened and the liquid will be forced in through the riser pipe 35 and will dump into the tank T. The pump P will continue to run as the tank T fills to maintain a vacuum in the tank T.

During the initial filling period the incoming liquid falls from the riser pipe opening 37 to the bottom of the tank T and foaming is induced. As the tank T fills the relatively light foam will be drawn into the dome 33 and toward the stand pipe 21 inlet. To reduce the amount of foam being drawn into the stand pipe 21, the bleeder pipe valve 42 is opened and air will be drawn therethrough and into the tank T. When the air exits from the stand pipe opening 41 it will strike the dome 33 and will be turned and pulled down into the interior of the tank T thus blowing foam from the dome. The dome 33 is thus maintained generally clear of foam but some of the foam will generally be pulled along with the air into the stand pipe 21 and also some liquid will splash thereinto thus necessitating the scrubbing of that air.

The major portion of the flow through the stand pipe 21 and into the scrubber S will be air but any large quantity of liquid that is pulled thereinto will fall down the coupled inlet pipe 60 and strike the bottom wall 67 of the separator 63 and pass through the inlet 62 and drain out through the drain openings 71. Smaller particles of liquid will remain suspended in the flowing air and will be spiralled outwardly in the flow chamber 68 and through the perforations 70 into the isolation chamber 69. Outward movement of the foreign particles from the inlet 62 and through the perforations 70 is greatly facilitated by the fact that the inlet 62 opens radially outwardly into the central portion of the flow chamber 68 and is disposed at the bottom of the flow chamber 68 with the air outlet 74 at the top. As a consequence of this arrangement the flow in the chamber 68 will mushroom or umbrella outwardly and upwardly away from the inlet 62. The contaminant particles, being heavier than the suspending air, will show greater tendency to continue their outward movement since the air will respond more readily to the vacuum pull communicated through the outlet 74. In addition, since the web 76 blocks counter-clockwise flow from the inlet 62, the entire incoming mixture must flow clockwise around the inlet pipe 60 thus effecting a spirally upward flow pattern. Again, the contaminant particles, being heavier than the suspending air, will assume arcuate paths having larger radii of curvature than that of the air molecules and will be centrifugally propelled through the perforations 70.

The contaminant particles ejected into the isolation chamber 69 will be substantially isolated from the air flowing in the flow chamber 68 and will fall downward and be collected in the collection receptacle 77 from where they can be removed through the drain valve 20. A small amount of air will pass through the perforations 70 and into the isolation chamber 69, but since such air is relatively light compared to the liquid oil particles, it will respond more readily to the vacuum pull toward the outlet 74 and will flow back in through the perforations and out the outlet. It is important to note that the perforations 70 must provide sufficient cumulative flow area for effective passage of the contaminant particles, while offering sufficient resistance to the spirally moving air flow in the flow chamber 68, to effectively isolate the chamber 69 from such flow. As noted earlier the preferred arrangement is with the perforations 70 spaced at the corners of approximately one inch squares and cumulatively comprising 20% of the total shell 65 area. Obviously, any arrangement of perforations 70 in the shell 65 that offers some resistance to the air flow will effect separation, but experimentation with a transparent scrubber S constructed in accordance with the appended drawings has proven that performance is greatly increased when the cumulative perforation area is below 50% of the total area of the shell. With greater perforation percentages there is a tendency for the ejected particles to remain suspended in the suspension chamber 69 rather than falling into the receptacle 77.

Any liquid that is not so separated from the air being forced through the scrubber S and into the pump line 79 will strike the splash plate 95 confronting the flow passage in the line and will fall into the collecting vessel 93 included in the float valve 91. If enough liquid is collected in the vessel 93 to float the gate 99, supported from the float ball 97, into its closed position, flow to the pump P will be stopped thus protecting it from contamination.

When the liquid level in the tank T raises sufficiently to float the float ball 48 and move the flapper 23 into closing position, flow to the pump P will be shut off and the resultant laboring of the pump will signify the operator that loading is complete.

When it is desirable to unload the tank T, the pump P will be reversed, to pressurize the tank T and the outlet valve (not shown) opened to expel the liquid out the outlet 15.

From the foregoing it will be clear that the scrubber S of this invention is simple and inexpensive to manufacture and that it is extremely effective in separating relatively small particles, as well as large slugs of contaminants from flowing air. In addition, the scrubber S will function effectively in a system employing vacuum to flow liquids and will handle large flow rates.

Various modifications and changes may be made with respect to the foregoing detailed description without departing from the spirit of the present invention or the scope of the following claims.

I claim:
1. A scrubber for use with a source of vacuum to clean air of a liquid, said scrubber comprising:
  a vertically elongated cylindrical container having a side wall and top and bottom walls;
  a cylindrical separator disposed in said container spaced from said side wall having an imperforate bottom wall and including a vertical perforated wall coaxially arranged relative to said side wall, the circumferential space between said perforated wall and said side wall defining an isolation chamber and the space below said separator and above said container bottom wall defining a collection chamber, the vertical perforated wall of said separator being formed at the lower portion above its bottom wall with a plurality of relatively large drain openings directly communicating with said collection chamber and said separator also being formed with an outlet in the top thereof;
  an outlet conduit on said container above said separator in communication with said outlet for connection with said source of vacuum;
  a vertical inlet conduit spaced from the outlet conduit extending coaxially through the upper portion of said container and into said separator to the bottom wall thereof, said inlet conduit having a discharge opening in its wall at the lower end thereof directly facing the bottom wall of said separator and said perforated wall;
  and a single vertically extending imperforate flow-directing web in said separator extending from said inlet conduit to said perforated wall from the bottom wall of said separator to a point above said discharge opening for directing the air discharged through said inlet conduit to flow in a spirally upward flow pattern tangential to the inner surface of said perforated wall, with any large quantity of said liquid striking the bottom wall of said separator and passing downwardly through said drain openings directly into said collection chamber and the smaller particles of said liquid remaining suspended in said air to spiral outwardly through said perforated wall into said isolation chamber to then flow downwardly into said collection chamber while the remaining substantially liquid-free air will flow upwardly through said outlet conduit.

2. A scrubber as set forth in claim 1 wherein the perforations of said perforated wall have an area of more than twenty percent but less than fifty percent of the total area of said perforated wall.

References Cited
UNITED STATES PATENTS

| | | | |
|---|---|---|---|
| 1,780,156 | 11/1930 | Hall | 55—419 |
| 1,878,052 | 9/1932 | Wilson et al. | 55—452 |
| 2,220,706 | 11/1940 | Canton | 55—418 |
| 2,418,381 | 4/1947 | Wegmann | 55—455 |
| 2,664,911 | 1/1954 | Thompson et al. | 210—123 |
| 3,201,919 | 8/1965 | Long | 55—191 |

HARRY B. THORNTON, *Primary Examiner.*

B. NOZICK, *Assistant Examiner.*